Sept. 20, 1932.     O. C. KIRN     1,878,782
APPARATUS FOR PUFFING STARCH CONTAINING MATERIALS
Filed Aug. 13, 1926     8 Sheets-Sheet 4
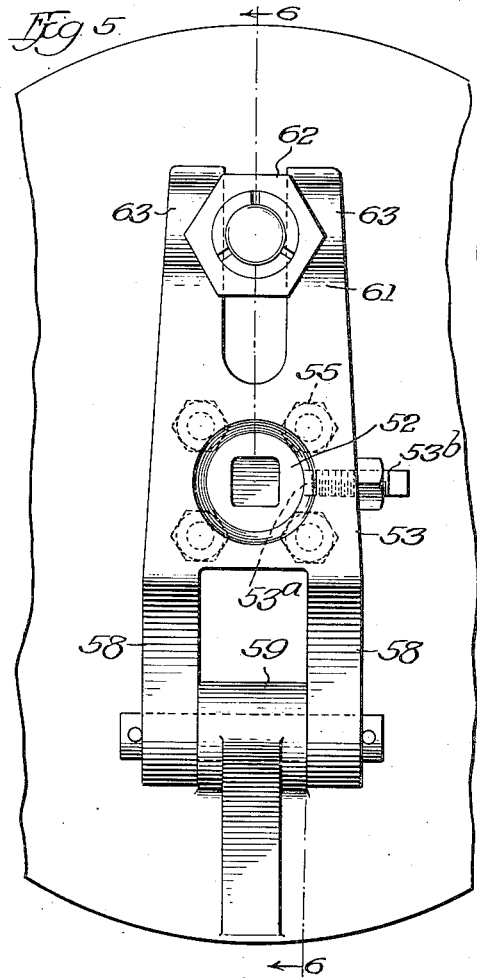
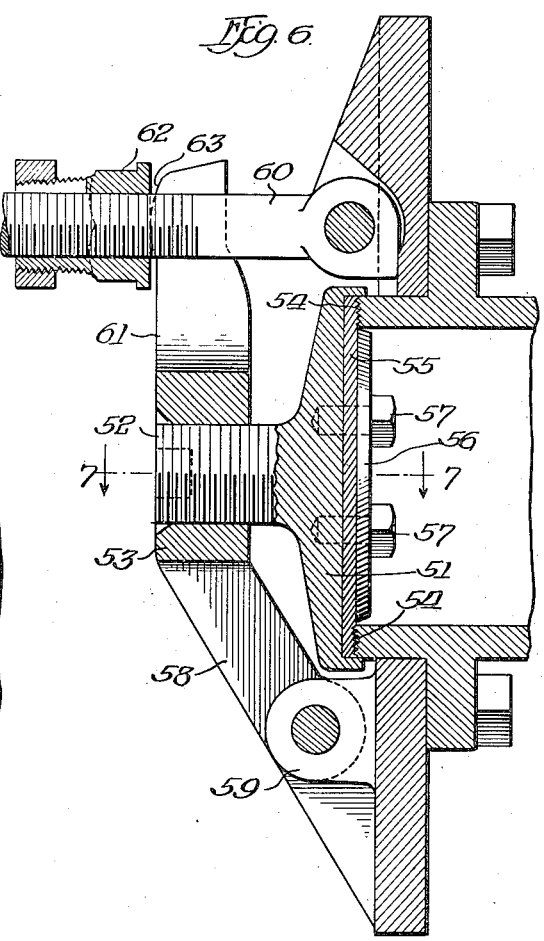
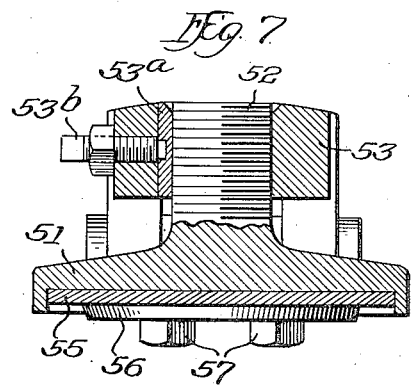
Inventor
Oscar C. Kirn
By Jones, Addington, Ames & Seibold
Attys.

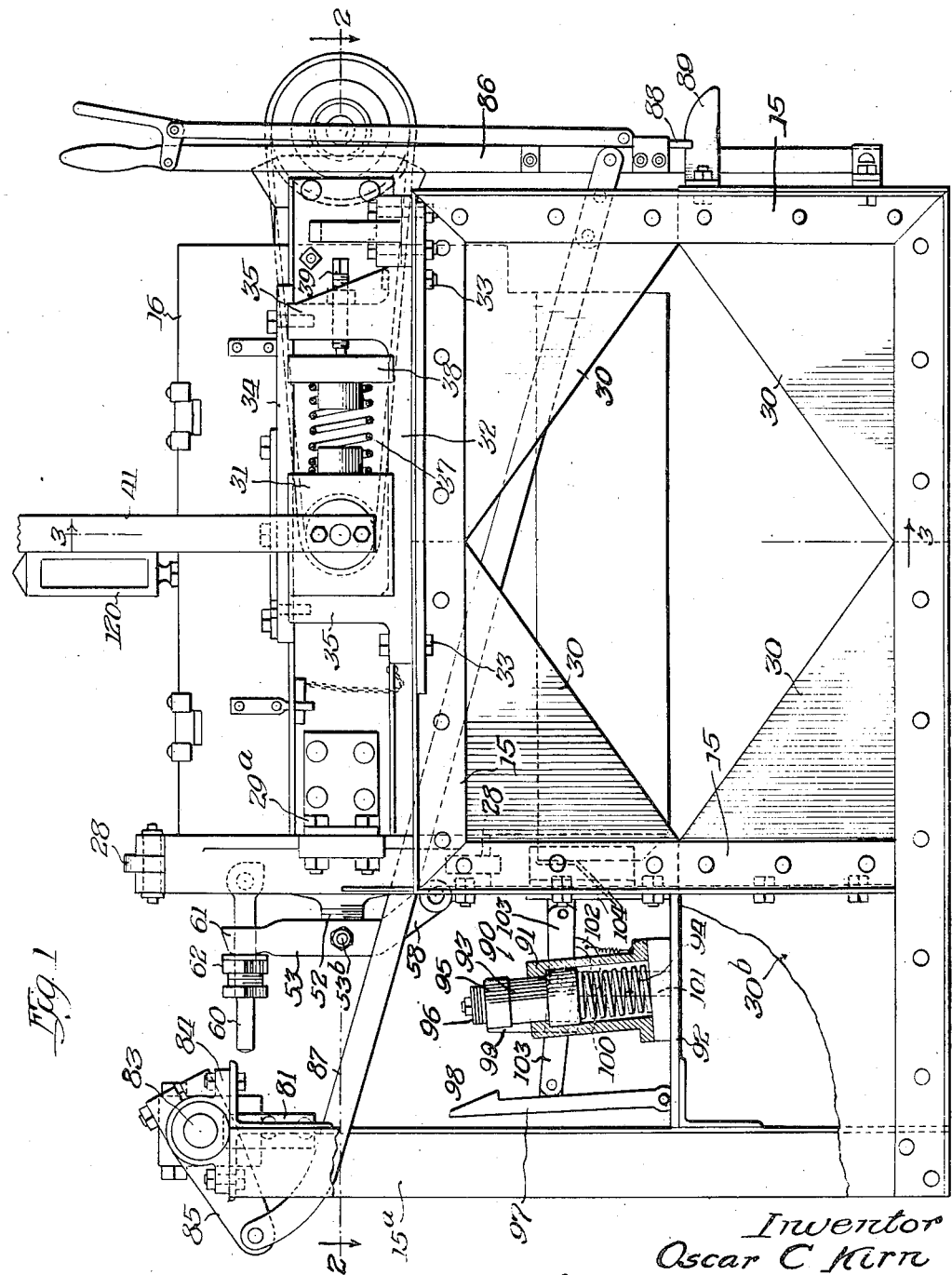

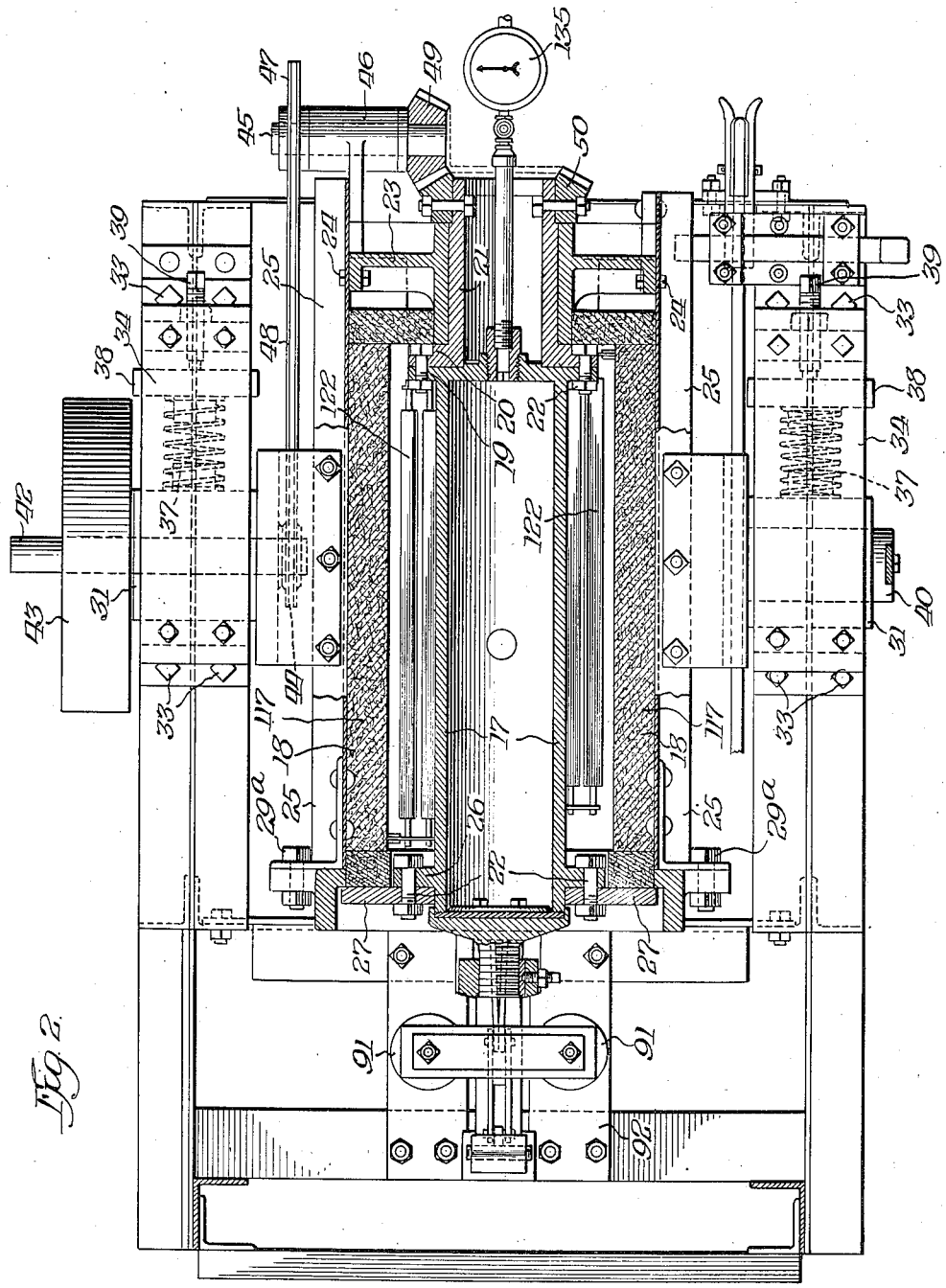

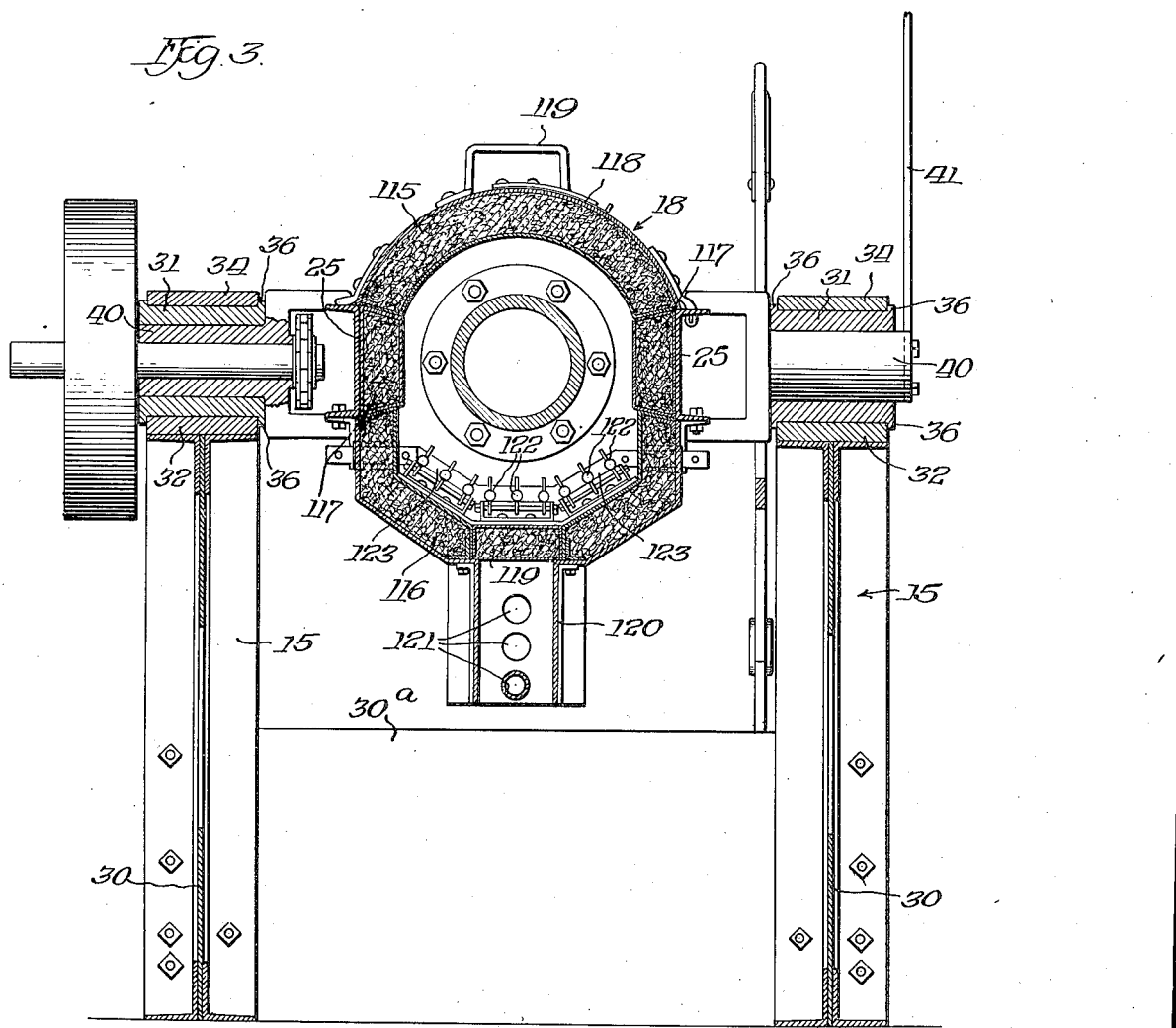
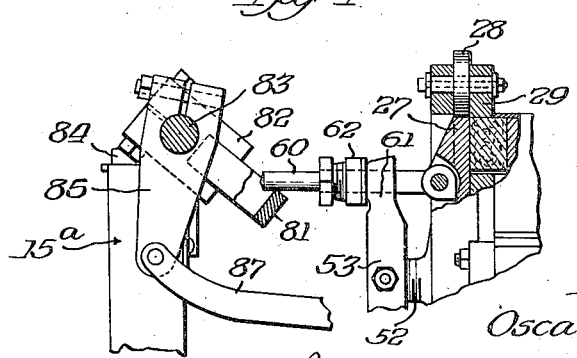

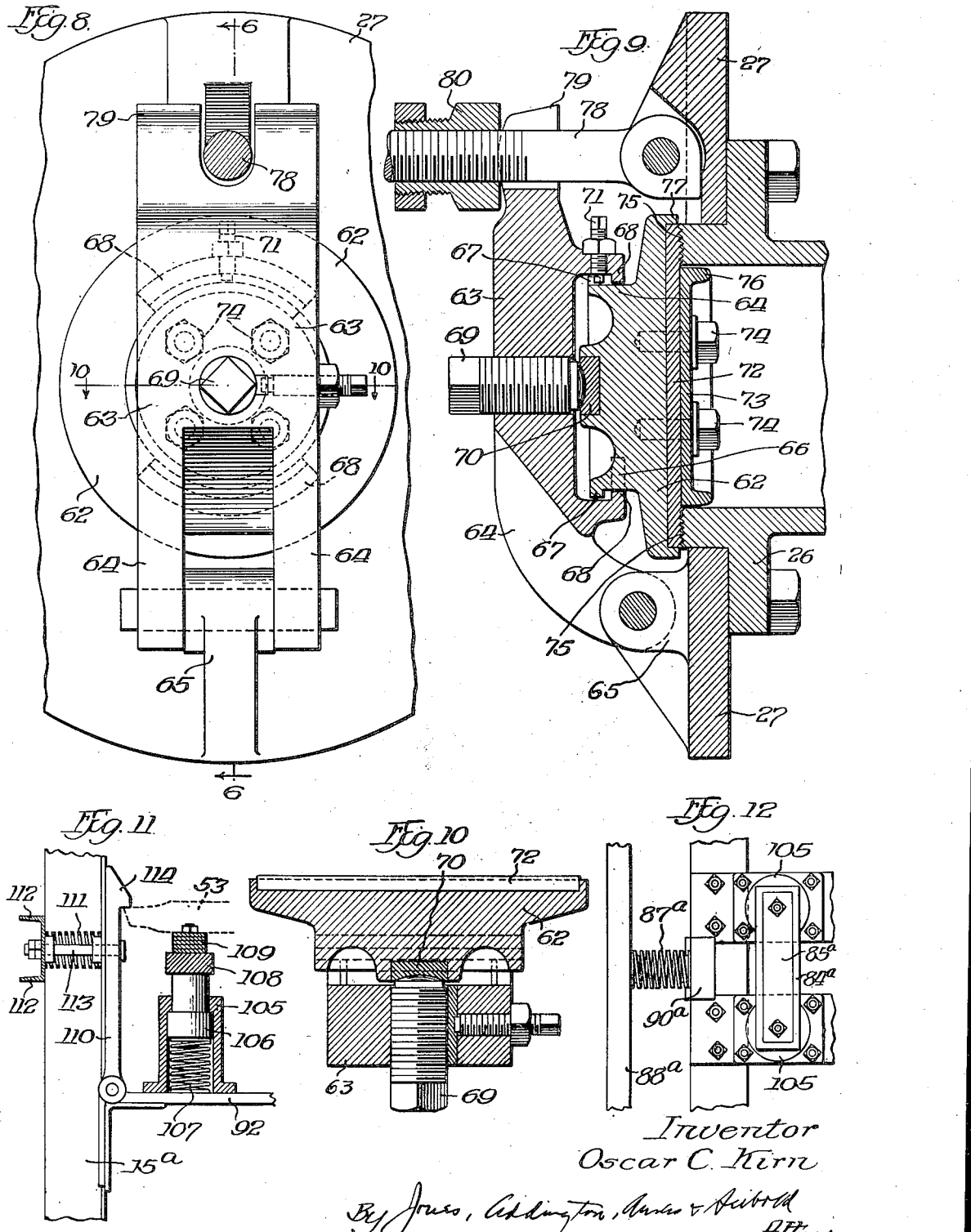

Sept. 20, 1932.  O. C. KIRN  1,878,782
APPARATUS FOR PUFFING STARCH CONTAINING MATERIALS
Filed Aug. 13, 1926  8 Sheets-Sheet 6
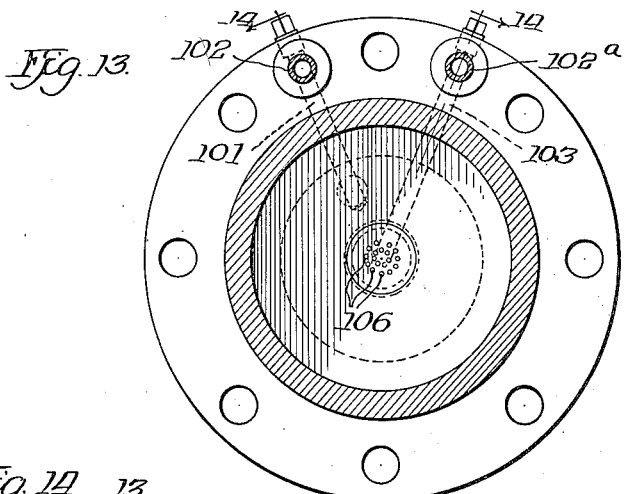
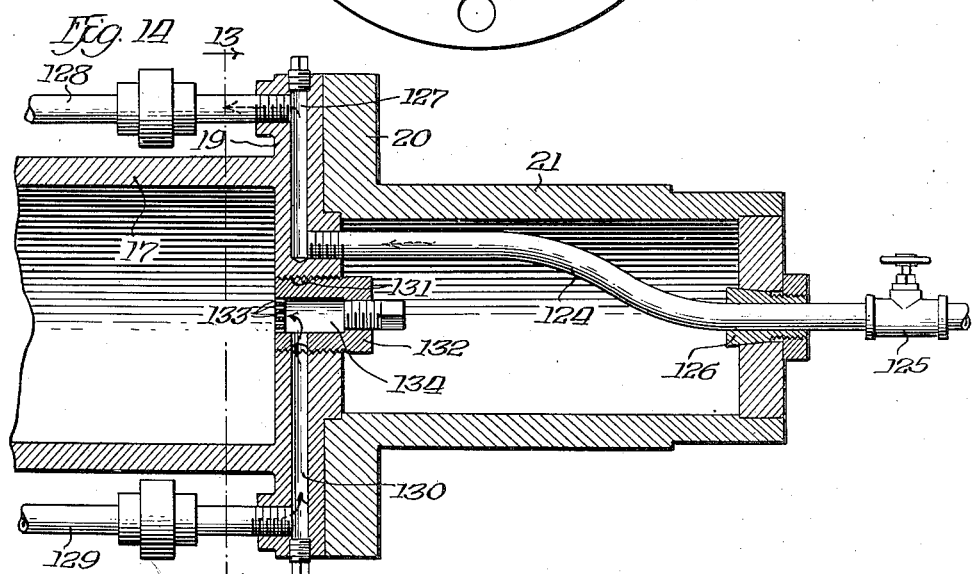
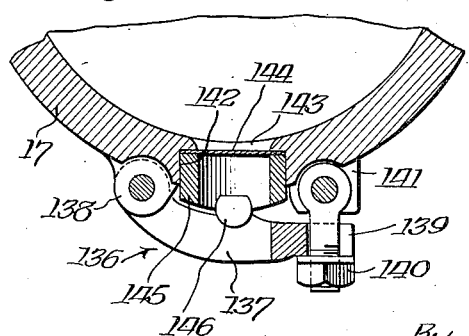
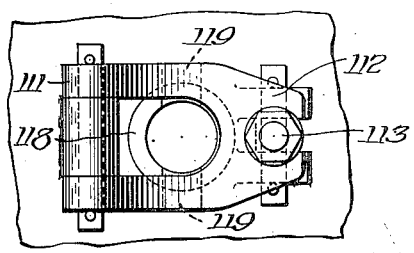
Inventor:
Oscar C. Kirn
By Jones, Addington, Ames & Seibold
Attys.

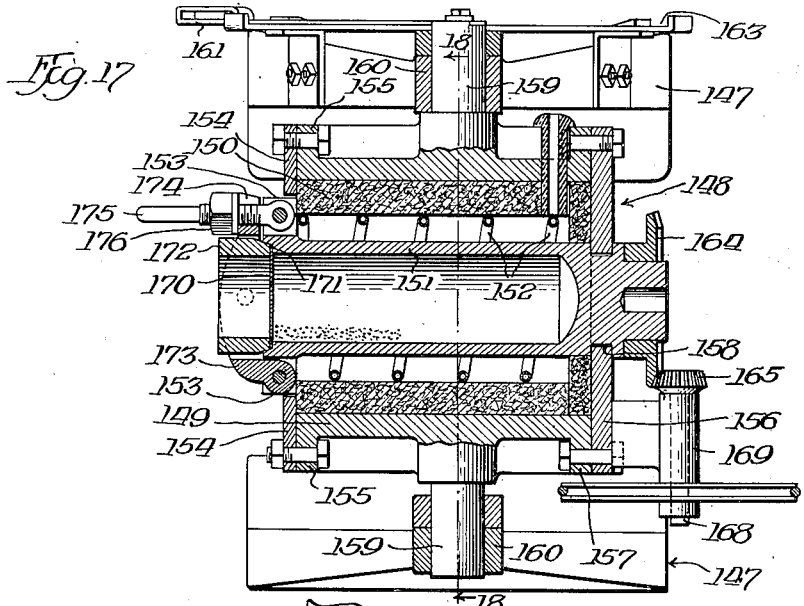

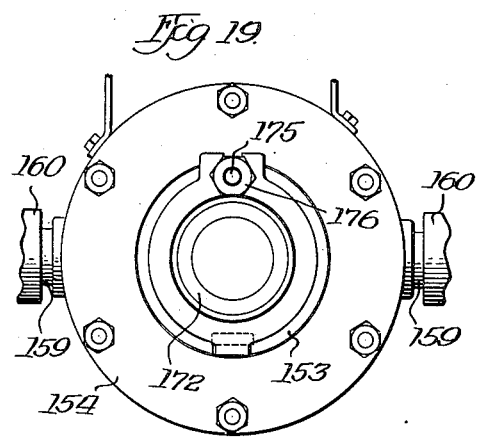
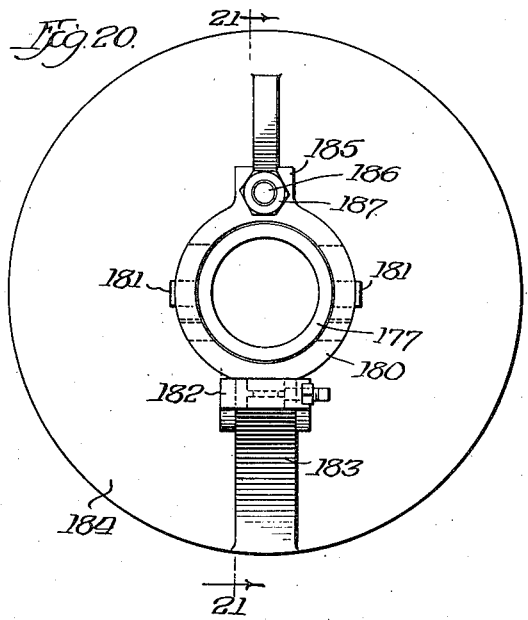
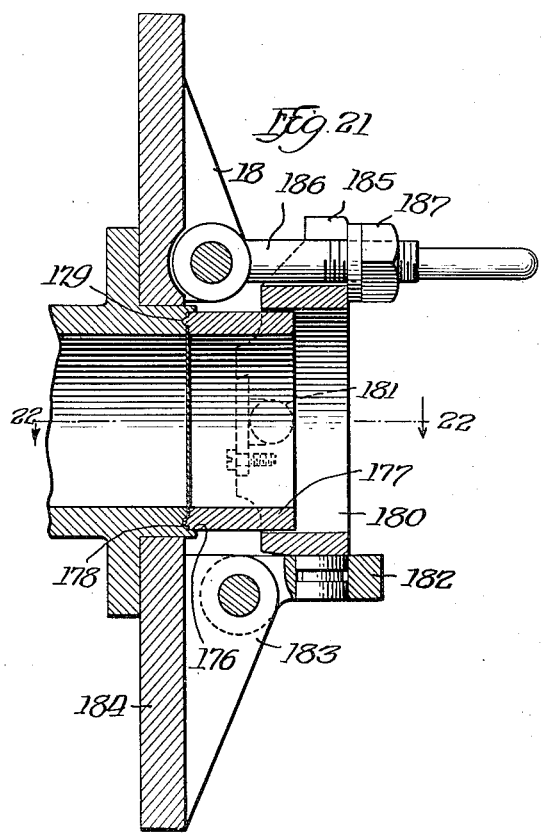
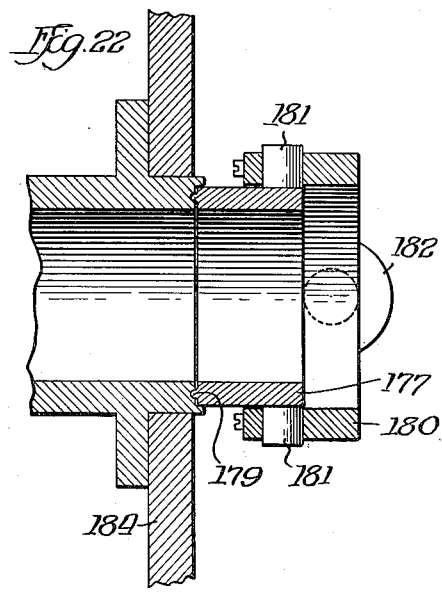

Patented Sept. 20, 1932

1,878,782

UNITED STATES PATENT OFFICE

OSCAR C. KIRN, OF CHICAGO, ILLINOIS, ASSIGNOR TO THE QUAKER OATS COMPANY, OF CHICAGO, ILLINOIS, A CORPORATION OF NEW JERSEY

APPARATUS FOR PUFFING STARCH-CONTAINING MATERIALS

Application filed August 13, 1926. Serial No. 128,917.

This invention relates to apparatus for and method of producing cooked and puffed or expanded grains of cereals and other starch containing foods, and it has especial relation to an apparatus for and method of the manufacture of cooked and puffed grains of cereals and other starchy foods, in which apparatus and by which method the food materials are first subjected to heat in a sealed container and raised to a predetermined pressure, after which said pressure is reduced to produce a swelling or puffing of the grain or other food substance being treated to a greatly increased size.

Heretofore in the preparation or manufacture of puffed cereals or the like, an apparatus has been utilized which comprised a gun or receptacle for containing the material to be treated, a carriage for supporting said gun, and a car for delivering said carriage from an oven where it had been heated to a cage for collecting the completed product.

While a satisfactory product has been produced by the method and the device just described, some disadvantages are present in the number of connections which are necessary, inasmuch as the oven is placed at a point remote from the cage. For example, after the gun is delivered to the oven, vapors must be withdrawn and steam ejected into the gun, as required, which calls for a connection with a stationary pipe system adjacent the oven. Furthermore, the temperature and pressure within the drum must be determined at all times, thus necessitating a connection with a thermometer and gauges. And still further, the drum must be rotated to permit of the tumbling of the grains withing the drum, and here again a further connection must be made with the drive mechanism. Other disadvantages of the above device and the manner in which they are overcome in the new apparatus and method will be apparent when the apparatus just described is contrasted with the elements and description of this present invention which comprises as a self-contained unit a tilting oven, which latter is to be heated by gas burners or electric heaters installed therein, and a stationary frame for supporting said oven.

One of the principal objects of my invention is to provide a method of puffing or expanding grain, and an apparatus for practicing said method, wherein the grain is subjected to atmospheric or other reduced pressure automatically upon the existence of a predetermined high pressure within a sealed chamber; that is, the invention contemplates the automatic relief of the interior pressure at a predetermined time, all through the functioning of simply operated and inexpensive means.

Another object of this invention is to provide a self-contained unitary apparatus for the manufacture of cooked and puffed cereals and other starch containing products.

A further object of this invention is to provide a self-contained unit of a tilting oven supported in a stationary frame.

A further object of this invention is to provide an improved safety device in the gun or cylinder of an appartus of the character above described.

A further object of this invention is to provide an improved hinged adjustable lid or cover for a gun in an apparatus of the character outlined whereby the discharge is substantially instantaneous.

A further object of this invention is to provide a self-contained unitary apparatus, such as has been indicated, which is sufficiently simple in operation as to require no highly specialized or skilled labor to operate the same, or when operated to capacity to produce large quantities of finished products, the necessary workmen will be reduced to a minimum.

Further objects of this invention will be apparent from the hereinafter description and from the drawings forming a part of the specification, to which latter reference may now be had for a more complete understanding of the characteristic features of this invention, in which:

Figure 1 is a side elevational view of an apparatus embodying the features of this invention, some parts of the same being shown in section;

Fig. 2 is a top plan sectional view taken on the line 2—2 of Fig. 1;

Fig. 3 is an elevational, sectional view taken on the line 3—3 of Fig. 1;

Fig. 4 is a fragmentary view of the tripping mechanism for operating the lid or the cover of the gun which contains the material;

Fig. 5 is a front elevational view of a portion of the head of the gun;

Fig. 6 is a sectional view taken on the line 6—6 of Fig. 5;

Fig. 7 is a sectional view taken on the line 7—7 of Fig. 5;

Fig. 8 is a front elevational view of a portion of a modified form of a head for a gun;

Fig. 9 is a sectional view taken on the line 9—9 of Fig. 8;

Fig. 10 is a sectional view taken on the line 10—10 of Fig. 8;

Fig. 11 is a side elevational view, partially in section, of a modified form of a bumper for receiving the impact of the gun head;

Fig. 12 is a top plan view of Fig. 11;

Fig. 13 is a sectional view taken on the line 13—13 of Fig. 14;

Fig. 14 is a sectional view taken on the line 14—14 of Fig. 13;

Fig. 15 is a sectional view of a portion of the gun showing the automatic pressure relief means;

Fig. 16 is a bottom plan view of Fig. 15.

Fig. 17 is a plan sectional view of another embodiment of this invention;

Fig. 18 is a sectional view taken on the line 18—18 of Fig. 17;

Fig. 19 is a front elevational view of the gun head as shown in Fig. 17;

Fig. 20 is a front elevational view of a modified type of gun head.

Fig. 21 is a sectional view taken on the line 21—21 of Fig. 20; and

Fig. 22 is a sectional view taken on the line 22—22 of Fig. 21.

Referring to the drawings, and particularly to Figs. 1, 2 and 3 thereof, the apparatus therein shown comprises a supporting structure 15 having a self-contained unit of an oven, indicated as a whole by the numeral 16, pivotally mounted thereon.

In a general sense the oven consists of a gun or a metallic cylinder 17 rotatably mounted within an insulated jacket 18 (the latter preventing loss of heat by radiation), and heating elements disposed within said insulating jacket and adjacent said gun.

In the operation of the apparatus, the gun is tilted to a vertical position and a charge of material is hermetically sealed therein and the gun returned to its normal horizontal position. The gun is now rotated, and the material therein subjected to heat for a definite period of time, whereafter, having obtained a predetermined pressure, the material is suddenly subjected to a reduced or atmospheric pressure by means of a manually or mechanically operated tripping mechanism, whereby the lid of the gun is displaced.

In order that these various parts and the operation thereof may be more fully understood, reference will be had to a more specific description of the details of the apparatus whereafter a more elaborate description of the complete operation will be given.

The gun 17 consists of a metallic cylinder, preferably of cast bronze, and may be of any desired length, the particular one indicated in the drawings being approximately seven inches in diameter by two and one-half feet in length. The interior of the drum is preferably smooth so that the material will not readily adhere to the sides thereof, and also that it may be conveniently cleaned and kept sanitary.

In order to rotate the gun within the oven, an annular flange 19, disposed on the gear end of the gun, is secured to a similar annular flange 20 of a tubular trunnion 21 by means of bolts 22, the heads of which latter are countersunk in the flange 20. The trunnion 21 is journalled in a two-part bearing member 23 which bearing is secured by bolts 24 to a pair of channel iron supports 25, said supports being positioned at diametrically opposite points on each side of the gun. An annular flange 26, disposed on the head end of the gun, is secured to a rolling disc 27 by means of bolts 22 and engage a plurality of rollers 28 which rollers are mounted in a ring 29 (see Fig 4) secured by bolts 29a to brackets mounted on the channel iron support 25. It is now apparent that since the head end of the gun is supported on rollers and the gear end of the gun is supported in a bearing member, the gun is free to rotate.

The supporting framework 15 comprises a pair of rectangular frames of angle iron members held in a fixed relation by means of plates 30 riveted or welded therebetween, and having one pair of frames on each side of the oven 16, which are held in a spaced-apart-relation by means of metal plates 30a. In order to absorb the shock and permit the gun to recoil when discharging the material, a pair of sliding bearings 31 are mounted in guides 32 and secured by bolts 33 to the supporting framework 15. A cap 34 is secured to each of a pair of uprights 35 extending from the guides 32 which serve to form guideways in which the bearings 31 may move horizontally, said bearings having lips 36 for the purpose of properly positioning the bearings in said guideways.

A spring tension, normally urging the sliding bearing 31 against one of said uprights 35, is produced by means of a coil spring 37 positioned between said bearing and sliding plate 38, which latter is adjusted by means of a screw member 39 extending through the other of said fixed uprights 35 and engaging said sliding plate.

In order to permit of the tilting of the gun when it is desired to recharge the same, a trunnion 40 is secured to each of the channel iron supports 25, which latter are journalled in the sliding bearings 31. This operation is controlled by a handle 41 secured to one of said trunnions. In addition to being tiltably mounted on its support, the gun is rotatably mounted within the oven, as has been hereinbefore stated. The means for rotating said gun comprises a shaft 42 extending through the center of one of the trunnions 40, said shaft having a pulley 43 fixedly mounted on the outer end thereof, and a sprocket gear 44 fixedly mounted on the inner end thereof. A second shaft 45 is journalled in a bearing member 46, which is mounted on one end of one of the channel iron supports 25, and said shaft has a sprocket gear 47, driven by means of the sprocket chain 48 from the sprocket gear 44, mounted on the outer end of said shaft 45. A bevel gear 49 is mounted on the inner end of said shaft 45 for engaging a bevel gear 50 on the tubular trunnion 21. It is obvious that since the drive shaft for the gun-rotating mechanism is concentric with the trunnions of the tilting means, the gun may be rotated by means of power remote from the apparatus.

The head end of the gun, as shown in Figs. 5, 6 and 7, is provided with a lid 51, preferably of bronze, which has a screw threaded member 52, preferably integral therewith, extending therefrom to threadedly engage a threaded aperture in a yoke 53. A key 53ª is positioned adjacent the threaded aperture in yoke 53 and is engaged by a set screw 53ᵇ which screw, when tightened, bears against the key 53ª to hold the same securely against the threaded member 52. It is preferable to provide screw threads in the key 53ª similar to those of the threaded member 52 so as not to mar the threads in the latter member. In this manner the lid 51 is adjustably mounted in the yoke 53.

In order to hermetically seal the interior of the gun, the end thereof is provided with a plurality of small corrugations or grooves 54 which, when the lid is closed, are permitted to sink into a lead gasket 55 secured within a recess on the inner surface of the face of the lid 51 by means of a clamping plate 56 and bolts 57. A pair of lugs 58 extend downwardly from the lid 51 and are pivotally mounted on a bearing member 59 extending from the rolling disc 27. The lid is held in a closed position on the gun by means of a lock bolt 60, which latter is pivotally secured to the gun and engages a forked projection 61 on the yoke 53, there being a jam nut 62 threaded on the outer end of the lock bolt to engage an arcuate surface 63 of the forked projection.

Also, as a modification thereof, as shown in Figs. 8, 9 and 10, the head end of the gun may be provided with a bronze lid 62 which is supported in a yoke 63 and hinged by lugs 64 to the lug 65 which projects from the rolling disc 27. In order to provide sufficient clearance to permit the lid to be tightly closed, the lid is provided with a reduced portion 66 having outwardly extending segmental flanges 67, which latter engage recesses formed by like segmental flanges 68 extending inwardly from the yoke member 63. A set screw 69 is threaded in the yoke member 63 and engages a steel disc 70 inserted in the center of the reduced portion of the lid whereby an even pressure is exerted over the entire engaging surfaces of the gun and the lid.

The set screw 71 engages a notch in the segmental flange member 67 and prevents any rotation of the lid 62 and at the same time permits the lid to have longitudinal motion. In order to effect a seal whereby the gun is made air-tight, the lid is provided with a lead gasket 72 secured to its inner surface by a clamping plate 73 and the bolts 74. As the end of the gun is provided with a plurality of small corrugations, or grooves 75, the lid when closed permits these corrugations to sink into the face of the gasket. The flanges 76 on the periphery of the clamping plate 73 and the peripheral lip 77 of the lid, serve to confine the gasket to its seat.

The lid is held in a closed position on the gun by means of a lock-bolt 78, which latter is pivotally secured to the gun and engages a forked projection 79 on the yoke 63, there being a jam-nut 80 threaded on the outer end of the lock-bolt to engage the outer surface of said forked projection.

In the operation of the lid in both instances just recited, the lock-bolt is brought into engagement with the forked projection by forcing the jam-nut down over the arcuate surface of the forked projection, which action causes the lid to be pressed tightly against the gun. To release the lid, the lock-bolt is forced upwardly and disengages the forked projection. Referring more particularly to Figs. 1 and 4, the mechanical means for releasing the lid comprises a U-shaped member 81 secured to a split-bearing member 82 adjustably mounted on a shaft 83. The shaft 83 is rotatably mounted in bearings 84 secured to an auxiliary supporting framework 15ª, similar in construction to the framework 15, and secured thereto by means of metal plates 30ᵇ. The shaft 72 is rotated by means of a crank 85 adjustably mounted thereon and connected to an operating lever 86 by means of a connecting link 87. The operating lever 86 is of the usual type and pivotally secured to the lower end of the supporting framework 15 with a bolt 88 for engaging a catch block 89 to hold the mechanism in a positive position. In the operation of the tripping mechanism, the bolt 88 is manually released from the catch block 89 and the operating lever 86 is pulled in a direction away from the apparatus, thereby rotating the shaft 83 to cause the U-shaped member 81 to strike the lock-bolt 60 and force the same in an upward direction to release the gun head.

Since a substantial pressure is created in the gun prior to the release of the lid, a bumper 90 is provided for receiving the impact of the lid when the gun is discharged which prevents injury to this latter member. The bumper comprises a pair of casings 91 suitably mounted on a base 92, which base is supported between the supporting frameworks 15 and 15ª. A plunger 93 is positioned within each of the casings 91 and are normally urged upwardly by the compression springs 94 which are also positioned within the casings 91. A bumper plate 95 extends across and is secured to the plungers 93 and has a belt cushion 96 secured to the surface of the bumper plate for engaging the head of the gun. Because of the force of the impact between the gun head and the bumper, a latch dog 97 is pivotally secured to the base 92 to prevent the head from rebounding.

The latch dog 97 is normally held in a position that will permit lip 98 on the upper end of said latch dog to engage the forked projection 61 of the lid on its upward movement after it has spent its force. To prevent undue wear or injury to the lip 98, the bumper is so constructed that the impact of the lid is received thereon before the forked projection 61 is in the same plane with said lip. This impact causes a projection 99, secured to the bumper plate 95 and in engagement with a pivotally mounted lever-arm 100, to move downwardly. The lever-arm 100 is supported on a bracket 101 suitably mounted on the base 92 and has an extension 102 integral therewith for engagement with one of a pair of toggle levers 103, one of said toggle levers being pivotally secured to the latch dog 97, while the other is secured to a suitable stationary support 104. As a result of the downward movement of the projection 99, the extension 102 is caused to move upwardly, thereby forcing the toggle levers to extend laterally and move the latch dog 97 outwardly. In this manner, the forked projection is permitted to pass the lip 98 without striking against the same, and after the force of the impact is absorbed, the latch dog returns to its normal position, whereby it engages the lid and prevents the latter from rebounding.

It may also be desirable to employ the construction as shown in Figs. 11 and 12, which construction provides a pair of casings 105 suitably mounted on the base 92. A plunger 106 is positioned within each of the casings 105 and is normally urged upwardly by the compression springs 107, which springs are also positioned within said casings. A bumper plate 108 extends across, and is secured to, the plungers 106 and has a belt cushion 109 secured to the upper surface thereof for engaging the head of the gun. In order to prevent the rebound of the gun head after the force of the impact has been absorbed, a latch dog 110 is pivotally secured to the base 92 and is held in the desired position by means of a spring member 111 mounted between the latch dog and a cross-member 112 secured to the framework 15ª, which spring normally urges the latch outwardly against the end of a bolt 113, which bolt is adjustable to hold the latch dog in a desired position. When the gun is discharged, the gun head is forcibly thrown downwardly and engages the bumper which absorbs the shock produced thereby. In the travel of the gun head, an engaging lip 114 of the latch dog is forced outwardly against the tension of the spring member 111 and is returned to its normal position to engage the forked projection 61 after the gun head has spent its force and is urged upwardly by the springs 107.

As shown in Figs. 2 and 3, the gun is provided with an insulating jacket 18 which comprises an upper member 115 pivotally fastened to the upper end of one of the supporting channels 25 and detachably secured to the upper end of the other of said supporting channels 25, a lower member 116 fixedly secured to the lower ends of the supporting channels 25, and an intermediate member 117 which is secured between said upper and lower members and to the inner faces of each of said supporting channels. Each of said insulating members comprises a jacket of sheet metal supported on an angle iron framework and having insulating material disposed within the walls of said insulating members. The upper member 115 is provided with a pair of vents 118 of any suitable construction, a handle 119, and a thermometer 120 for registering the temperature within the oven formed by the insulating jacket. The lower member 116 is provided with a removable portion 119, the use of which is dependent upon the type of heat being used, which will hereinafter be more fully explained.

When heat by gas is desired, a combination chamber 120 is provided comprising a chamber open on the bottom for admitting air and open at the top for registering with an opening provided in the lower insulating member when the portion 119 is removed. A plurality of apertures 121 are provided in the ends of the combustion chamber at various distances from the gun in order that a gas pipe may be inserted into one of said apertures at a desired or predetermined position, depending upon the characteristics of the gas employed.

The gas pipe is connected through suitable valves and connections to a gas supply main and is serrated or perforated in the usual manner which allows for an escape of gas to be ignited in order to heat the gun. In the use of electrical heating elements, the portion 119 is placed in position in the lower insulating member and a plurality of heating elements 122 are suitably arranged on bus bars 123 which are secured to the bottom of the oven.

Frequently it becomes advisable to inject live or superheated steam into the gun to build up the pressure therein and to maintain also a temperature within the gun corresponding to the temperature on the outer walls thereof in order to prevent any condensation collecting within the gun.

Referring particularly to Figs. 13 and 14, a pipe system is shown capable of being connected with a remote supply of steam, said system comprising an inlet pipe 124 having a valve 125 thereon and extending through a jam-nut construction 126 on the tubular trunnion 21 to the end wall of the gun. A passageway 127 is drilled in said wall to connect with a superheater pipe 128 which is threaded in the flange 19. The superheater pipe extends lengthwise of and adjacent to the gun in the chamber, which latter is placed between the top insulating member 91 and the gun, and is formed into a plurality of superheater coils. The other end of the coil 129 is threaded into the flange 19 and connects with a passageway 130 which is in communication with an annular groove 131 in a steaming plug 132, the plug being threaded into the end of the gun.

A plurality of small holes 133 are drilled into the end of the plug 132 to afford communication between the inside of the gun and a chamber 134 provided in the plug, which chamber is in communication with the annular groove 131.

When it is desired to admit live steam into the gun, the valve 125 is opened and steam is passed through the superheating coils 128, which serves to superheat the steam within the oven, after which the steam is then passed through the small apertures 133 where the stream of steam is broken and evenly distributed within the gun. A pressure gauge 135 is connected in the steam line to determine the pressure within the gun. It is to be understood that instead of the steam passing through the superheating coils 128, it may be injected directly into the gun as shown in detail in Fig. 2 of the drawings.

As initially indicated, my invention contemplates providing a gun or heated chamber, as above described, with means permitting the automatic relief or reduction of the pressure in the interior of the gun when the same reaches a predetermined limit. Such means may serve to prevent the pressure built up within the gun from becoming so great as to cause a premature explosion of the gun, thereby endangering the lives of the workmen as well as destroying the device itself, therefore a safety plug 136 is provided in the lower end of the gun, as shown in Figs. 15 and 16. This safety plug comprises a yoke 137 pivotally secured at one end to a lug 138 on the gun, which yoke has a forked projection 139 on the other end, into which latter a lock-bolt 140 is engaged, while the lock-bolt is pivotally mounted on a lug 141 of the gun. An aperture 142 is provided in the gun wall between said lugs and is reduced as at 143 to produce a shoulder against which a thin metal disc 144, preferably of German silver, is placed and held in position by means of a metal ring 145 pressing thereagainst, said metal ring being pivotally secured to the yoke 137 by means of a pin 146. It will be apparent that with the use of a disc of a predetermined thickness any undue pressure within the gun will cause the disc to burst and relieve that pressure. And it follows, of course, that by varying the thickness of the disc, the pressure at which the disc will burst will also vary.

In the puffing of starch-containing materials, the complete manipulation of the apparatus is as follows: The gun and its associated parts are tilted on the trunnions 40 to a vertical position to receive a charge of material. This charging may be accomplished by a measuring device overhanging the apparatus, or by other manual or mechanical means. The head is then clamped in position by means of the locking bolt 60, and the gun is swung back to its normal horizontal operative position. The gun is then rotated by means of the power pulley 43 which action causes a tumbling about of the material within the gun at the time it is being given the required treatment. This treatment may be the application of heat within the oven to heat the gun or the injecting of live or superheated steam within the gun, either or both methods of heating serving to build up the necessary pressure. The temperature and pressure are at all times ascertained by the thermometer 120 and the gauge 135.

At the end of the treatment in the oven, the operator pulls the operating lever 86 in a direction away from the machine, which action causes the tripping mechanism to force the locking-bolt 60 upwardly to release the gun head suddenly. The pressure within the gun forces the gun head to swing downwardly on its pivot to a locked position on the bumper 90, and the material within the gun is discharged, preferably into a screened cage. This action is brought about very suddenly, and the extreme reversal of pressure results in the puffing or swelling of the grains to many times their original or normal size. The gun is now ready to be again tilted on its trunnions 40 to a vertical position to receive another charge of material and the operation is again repeated in the manner just described.

A further embodiment of this invention is illustrated in Figs. 17 and 18 of the drawings, which embodiment comprises a self-contained unitary apparatus including a supporting structure 147 having an oven 148 tiltably mounted thereon. The supporting structure consists of a pair of brackets disposed on each side of the oven and having suitable means for securing said brackets to a floor or platform.

The oven 148 comprises a jacket 149 having an insulating material 150 on the inner surface thereof, a rotatable gun barrel 151, and an electrical heating element 152. In order to support the head end of the gun barrel in a rotatable relation with a jacket, a rolling disc 153 is provided on the gun barrel for engaging the inner periphery of a flange 154, which latter is secured to a flange 155 of the jacket 149. The gear end of the gun barrel is supported by the jacket in a rotatable relation therewith by means of a flange 156 secured to a flange 157 of the jacket, said flange 156 engaging an annular groove 158 in the gun barrel.

The oven is tiltably mounted on the supporting structure, as has been stated, and the means for accomplishing this result comprises a pair of trunnions 159 preferably integrally associated with the jacket 149 and journalled in bearings 160. A means for positively holding the oven in a vertical or horizontal position is provided by a locking lever 161 of spring steel, one end of said lever being fixed to the end of one of said trunnions and extending downwardly to engage a quadrant 162 suitably secured to the supporting structure. A notch 163 is provided on each end of the quadrant into one of which notches the lever 161 engages, thereby determining the position in which the oven is to be held.

The gun barrel 151 is rotated within the insulating jacket by means of a bevel gear 164 secured to the end of said gun and also meshing with a bevel pinion 165. An electric motor 166 is secured to a platform 167 suitably mounted on the flanges of the jacket 149 and serves to drive a shaft 168 journalled in a bearing 169 secured to the jacket, the shaft having the bevel pinion 165 fixedly mounted thereon.

The head end of the gun barrel is enclosed by means of a metal disc 170 preferably of German silver, mounted in a seat 171 and held in position by means of a seal ring 172. A yoke 173, in which the seal ring is pivotally mounted, is pivotally secured at its lower end to the gun barrel and has forked projection 174 at its upper end, into which a lockbolt 175 is engaged, the latter being pivotally secured to the rolling disc 153 and having a nut 176 for engaging the threaded portion thereof to provide the proper tension on the yoke.

In the operation of this embodiment of the invention, the oven is tilted by means of the locking lever 161 to a vertical position and held in that position until a charge of material is received. The metal disc 170 is placed on its seat 171 and the yoke swung into position to clamp the disc and in this manner hermetically seals the gun barrel. The oven is then released by the locking lever and swung back to its normal, horizontal operating position, whereafter the motor is energized to rotate the gun barrel and this action tumbles the material about within the gun barrel while it is being heated by the heating coil 125. This treatment tends to build up a pressure within the gun and when a predetermined pressure has been reached, the thin metal disc 170 is caused to burst and the material within the gun is discharged. The sudden reduction in pressure following this action results in the puffing or swelling of the material to many times its original or normal size. The apparatus is now in position to repeat the aforedescribed operation.

It will be understood that the pressure, at which it is desired to reduce the pressure on the grain in the gun, is predetermined by a calculated selection of a disc of the proper thickness and thus I am enabled to attain the object heretofore set forth, namely, an automatic discharge of the gun at any desired pressure in an extremely simple and inexpensive manner, since the metal disc which must be supplied upon each discharge of the gun is of relatively low cost.

As a modification of the above mentioned type of gun head, the structure as shown in Figs. 20, 21 and 22 contemplates the use of a gun barrel having a recessed portion 176 into which a seating ring 177 is disposed for holding a metal disc 178 in position against said recessed portion 176. In order to insure an hermetic seal within the gun, an annular groove 178 may be positioned on the end of said gun into which a bead 179 on the sealing ring may be engaged. The sealing ring 177 is pivotally mounted in a yoke 180 by means of extensions 181 extending from said sealing ring and engaging recessed portions in said yoke. The yoke 180 is, in turn, rotatably mounted in a bearing 182 which latter is pivotally mounted on a lug 183 on a rolling disc 184. The upper portion of the yoke has a forked projection 185 which is adapted to receive a bolt 186, the bolt being pivotally mounted on the rolling disc 184 and having a nut 187 threaded thereon to engage the outer surface of the forked projection 185.

It will be apparent from the foregoing description that the pressure exerted on the sealing ring is evenly distributed over the periphery of the metal disc by means of the rotatable adjustment afforded by the bearing 182 and also by the pivotal adjustment afforded by the projection 181. Moreover, the interior of the gun is readily accessible by means of the yoke 180 being pivotally mounted on the bearing 183 and having an adjustable locking bolt which will permit of a substantially instantaneous release of the gun head.

It is believed that the constructions herein shown and described, provide novel devices which are more economical to operate and less expensive to manufacture than any of the devices now on the market, and while it is preferable to embody this invention in these devices, various other forms will be apparent to those skilled in the art, and therefore this invention is to be limited only by the scope of the appended claims and the prior art.

I claim:

1. The method of puffing or expanding grain products which comprises heating said grains to a high pressure and then automatically reducing the pressure thereupon when the same attains a predetermined value.

2. The method of puffing or expanding grain products which comprises heating said grains to a high pressure and then automatically reducing the pressure thereupon by utilizing a predetermined high pressure to cause said automatic reduction.

3. In an apparatus of the class described, means for subjecting grain to a high pressure, and means responsive to a predetermined pressure for automatically reducing said pressure to cause an expansion of the grain.

4. In an apparatus of the class described, means comprising an enclosed chamber or gun within which grain may be subjected to a high pressure and means associated with said chamber and responsive to a predetermined pressure for automatically reducing said pressure when a predetermined value thereof is attained.

5. In an apparatus of the class described, means comprising an enclosed chamber or gun within which grain may be subjected to a high pressure, and means for discharging the contents of said gun at a predetermined pressure comprising a frangible member.

6. In an apparatus of the class described, means comprising an enclosed chamber or gun within which grain may be subjected to a high pressure, and means for discharging the contents of said gun at a predetermined pressure comprising a readily replaceable frangible member the thickness or resistance of which is governed by the pressure at which discharge is desired.

7. In an apparatus of the class described, means for subjecting grain to high pressures comprising an enclosed chamber or gun, means for raising the pressure therein, closure means for said gun comprising a member rupturable at a predetermined pressure to discharge said gun, the thickness of said member controlling the pressure at which the same is broken and the gun discharged.

8. A self-contained unitary apparatus for puffing starch-containing materials comprising a support, an oven tiltably mounted on said support, a gun for containing materials to be treated and rotatably mounted within said oven, and means for rotating said gun, said rotating means being in engagement continuously with the gun.

9. A self-contained unitary apparatus for puffing starch-containing materials comprising a support, an oven tiltable mounted on said support, a gun for containing the material to be treated and rotatably mounted within said oven, a lid pivotally mounted on said gun, means on said gun for clamping the lid in a closed position, means for sealing said lid when closed, and means for suddenly releasing said clamping means.

10. A self-contained unitary apparatus for puffing starch-containing materials comprising a support, an oven tiltably mounted on said support, a gun for containing materials to be treated and rotatably mounted within said oven, a lid pivotally mounted on said gun and having a forked projection thereon, a lock-bolt pivotally mounted on said gun for engaging said forked projection and for clamping the lid in a closed position, means for sealing said lid when closed, and means for engaging said lock-bolt for suddenly releasing the lid.

11. A self-contained unitary apparatus for puffing starch-containing materials comprising a support, an oven tiltably mounted on said support, a gun for containing materials to be treated and rotatably mounted within said oven, a yoke pivotally mounted on said gun and having recesses formed by segmental flanges thereon, a lid having projections adapted to loosely engage said recesses, adjustable means on said yoke for engaging said lid, means for sealing said lid when closed, a lock-bolt pivotally mounted on said gun for clamping the yoke in a closed position, and means for engaging said lock-bolt for suddenly releasing the lid.

12. A self-contained unitary apparatus for puffing starch-containing materials comprising a support, an oven tiltably mounted on said support, a gun for containing materials to be treated and rotatably mounted within said oven, a lid pivotally mounted on said gun, means on said gun for clamping the lid in a closed position, means for suddenly releasing said clamping means, a bumper mounted on said support for receiving the impact of said lid and absorbing the shock attendant therewith, and a latch dog to prevent said lid from rebounding.

13. A self-contained unitary apparatus for puffing starch-containing materials comprising a support, an oven tiltably mounted on said support, a gun for containing materials to be treated and rotatably mounted within said oven, a lid pivotally mounted on said gun, means on said gun for clamping the lid in a closed position, means for suddenly releasing said clamping means, a bumper mounted on said support for receiving the impact of said lid and absorbing the shock attendant therewith, said bumper comprising a plurality of casings, a plurality of spring pressed plungers in said casings and a bumper plate secured to said plungers.

14. A self-contained unitary apparatus for puffing starch-containing materials comprising a support, an oven tiltably mounted on said support, a gun for containing materials to be treated and rotatably mounted within said oven, a lid pivotally mounted on said gun, means on said gun for clamping the lid in a closed position, means for suddenly releasing said clamping means, a bumper mounted on said support for receiving the impact of said lid and absorbing the shock attendant therewith, a latch dog pivotally mounted on said supporting structure, and adjustable spring tensioning means associated with said latch dog whereby said lid may pass said dog in one direction only.

15. A self-contained unitary apparatus for puffing starch-containing materials comprising a support, an insulated jacket tiltably mounted on said support, a gun for containing materials to be treated and rotatably mounted within said jacket, and means for heating said gun.

16. A self-contained unitary apparatus for puffing starch-containing materials comprising supports, slidable bearings mounted on said supports, an oven tiltably mounted on said slidable bearings, a gun for containing materials to be treated and rotatably mounted within said oven, and means for rotating said gun.

17. A self-contained unitary apparatus for puffing starch-containing materials comprising supports, a guide member secured to each of said supports, a slidable bearing engaging said guide members, a spring member for urging said bearings in a positive position in said guide member, an oven tiltably mounted on said slidable bearings, a gun for containing materials to be treated and rotatably mounted within said oven, and means for rotating said gun.

18. A self-contained unitary apparatus for puffing starch-containing materials comprising supports, a guide member secured to each of said supports, slidable bearings mounted on said guide members, an oven tiltably mounted on said slidable bearings, a gun for containing materials to be treated and rotatably mounted within said oven, and means for rotating said gun, said guide member comprising a base, an upright on each end of said base, a cap secured to said uprights, said slidable bearing being slidably mounted between said cap and said base, and adjustable spring tensioning means supported by one of said uprights and normally urging said slidable bearing in a positive position against the other of said uprights.

19. A self-contained unitary apparatus for puffing starch-containing materials comprising a support, an oven tiltably mounted on said support, a gun for containing materials to be treated and rotatably mounted within said oven, and means mounted on said oven for rotating said gun whereby said rotating means are continuously in engagement with the gun.

20. A self-contained unitary apparatus for puffing starch-containing materials comprising a support, an oven, a trunnion mounted on each side of said oven and journalled in said support, a gun for containing materials to be treated and rotatably mounted within said oven, driving means journalled in one of said trunnions, and driving means mounted on said oven for rotating said gun and driven by said first mentioned driving means.

21. A self-contained unitary apparatus for puffing starch-containing materials comprising a support, slidable bearings mounted on said support, an oven, a trunnion mounted on each side of said oven and journalled in said slidable bearings, a gun for containing materials to be treated and rotatably mounted within said oven, driving means journalled in one of said trunnions, and driving means mounted on said oven for rotating said gun and driven by said first mentioned driving means.

22. A self-contained unitary apparatus for puffing starch-containing materials comprising a support, a guide member mounted on said support, slidable bearings mounted on said guide member, an oven, a trunnion mounted on each side of said oven and journalled in said slidable bearings, a gun for containing materials to be treated and rotatably mounted within said oven, driving means journalled in one of said trunnions, and driving means mounted on said oven for rotating said gun and driven by said first mentioned driving means.

23. A self-contained unitary apparatus for puffing starch-containing materials comprising a support, an oven, a trunnion mounted on each side of said oven and journalled in said support, a gun having a bevel gear on one end thereof and rotatably mounted within said oven, a shaft having a sprocket gear and a driving means on opposite ends thereof and journalled in one of said trunnions, a second shaft having a sprocket gear and a bevel gear mounted on opposite ends thereof and journalled on said oven, said bevel gear on said second shaft engaging said bevel gear on said gun, and a sprocket chain connecting each of said sprocket gears for rotating said gun.

24. A self-contained unitary apparatus for puffing starch-containing materials comprising a support, a guide member mounted on said support, slidable bearings mounted on said guide member, a spring member for urging said slidable bearings in a positive position in said guide member, an oven, a trunnion mounted on each side of said oven and journalled in said slidable bearings, a gun having a bevel gear on one end thereof and rotatably mounted within said oven, a shaft having a sprocket gear and a driving means on opposite ends thereof and journalled in one of said trunnions, a second shaft having a sprocket gear and a bevel gear mounted on opposite ends thereof and journalled on said oven, said bevel gear on said second shaft engaging said bevel gear on said gun, and a sprocket chain connecting each of said sprocket gears for rotating said gun.

25. A self-contained unitary apparatus for puffing starch-containing materials comprising a support, an oven tiltably mounted on said support, a gun for containing materials to be treated and rotatably mounted within said oven, and means for rotating said gun, said gun having a rolling disc on one end thereof for engaging said oven and a bearing surface on the other end thereof for engaging a bearing on said oven.

26. A self-contained unitary apparatus for puffing starch-containing materials comprising a support, an oven tiltably mounted on said support, a plurality of rollers mounted on one end of said oven, a bearing mounted on the other end of said oven, a gun for containing materials to be treated, a roller disc mounted on one end of said gun for engaging said rollers, said gun having a bearing surface on the other end thereof for engaging said bearing on said oven, and means for rotating said gun.

27. A self-contained unitary apparatus for puffing starch-containing materials comprising a support, an oven tiltably mounted on said support, a gun for containing materials to be treated and rotatably mounted within said oven, means continuously in engagement with, and for rotating said gun, and means for injecting steam into said gun while being heated and rotated in the oven.

28. A self-contained unitary apparatus for puffing starch-containing materials comprising a support, an oven tiltably mounted on said support, a gun for containing materials to be treated and rotatably mounted within said oven, means continuously in engagement with, and for rotating said gun, and an inlet pipe projecting into said drum and coaxial therewith for injecting steam into said gun while being heated and rotated in the oven.

29. A self-contained unitary apparatus for puffing starch-containing materials comprising a support, an oven tiltably mounted on said support, a gun for containing materials to be treated and rotatably mounted within said oven, means for rotating said gun, a plurality of interconnecting heating coils mounted in said oven, an inlet pipe coaxial with said drum and in communication with one end of said heating coils, the other end of said heating coils being in communication with said gun for injecting superheated steam therein while said gun is being heated and rotated in said oven.

30. A self-contained unitary apparatus for puffing starch-containing materials comprising a support, an oven tiltably mounted on said support, a gun for containing the material to be treated and rotatably mounted within said oven, means for rotating said gun, said gun having passageways in one end thereof, a heating coil mounted in said oven having one end thereof in communication with one of said passageways and the other end thereof in communication with the other of said passageways, an inlet pipe coaxial with said gun and in communication with said first mentioned passageway, said second mentioned passageway having communication with said gun for injecting superheated steam therein while said gun is being heated and rotated in said oven.

31. A self-contained unitary apparatus for puffing starch-containing materials comprising a support, an oven tiltably mounted on said support, a gun for containing the material to be treated and rotatably mounted within said oven, means for rotating said gun, said gun having passageways in one end thereof, a heating coil mounted in said oven having one end thereof in communication with one of said passageways and the other end thereof in communication with the other of said passageways, a steaming plug projecting into said gun, an inlet pipe coaxial with said gun and in communication with said first mentioned passageway, said second mentioned passageway having communication with said steaming plug for injecting superheated steam into said gun while being heated and rotated in said oven.

32. A self-contained unitary apparatus for puffing starch-containing materials comprising a support, an oven tiltably mounted on said support, a gun for containing the material to be treated and rotatably mounted within said oven, means for rotating said gun, said gun having passageways in one end thereof, a heating coil mounted in said oven having one end thereof in communication with one of said passageways and the other end thereof in communication with the other of said passageways, a steaming plug projecting into said gun, an inlet pipe coaxial with said gun and in communication with said first mentioned passageway, said second mentioned passageway having communication with said steaming plug for injecting superheated steam into said gun while being heated and rotated in said oven, said steam plug having a plurality of relatively small apertures for breaking the flow of steam and distributing the same within the gun.

33. A self-contained unitary apparatus for puffing starch-containing materials comprising a support, an oven tiltably mounted on said support, a gun for containing materials to be treated and rotatably mounted within said oven, means for rotating said gun, said gun having a recess therein, a frangible disc for engaging said recess, and means for holding said disc securely against said recess, said frangible disc being adapted to break above a predetermined pressure.

34. A self-contained unitary apparatus for puffing starch-containing materials comprising a support, an oven tiltably mounted on said support, a gun for containing materials to be treated and rotatably mounted within said oven, means for rotating said gun, said gun having a recess therein, a frangible disc for engaging said recess, a yoke member pivotally mounted on said gun, a ring member for holding said disc securely against said recess and secured to said yoke member, and a locking-bolt for engaging said yoke, said frangible disc being adapted to break above a predetermined pressure.

35. A self-contained unitary apparatus for puffing starch-containing materials comprising a support, an oven tiltably mounted on said support, a gun for containing materials to be treated and rotatably mounted within said oven, means for rotating said gun, said gun having a recess therein, a frangible disc for engaging said recess, a ring member for holding said disc securely against said recess, and securing means for engaging said ring member, said frangible disc being adapted to break above a predetermined pressure.

36. A self-contained unitary apparatus for puffing starch-containing materials comprising a support, an oven tiltably mounted on said support, a gun for containing materials to be treated and rotatably mounted within said oven, means for rotating said gun, said gun having a recess therein, a frangible disc for engaging said recess, a yoke member pivotally mounted on said gun, a ring member for holding said disc securely against said recess and pivotally mounted on said yoke member, and a locking-bolt for engaging said yoke, said frangible disc being adapted to break above a predetermined pressure.

37. In an apparatus for puffing starch-containing materials, the combination with a gun into which the material is introduced and which is subjected to heat during the treatment of said material, of a frangible disc at one end of said gun, clamping members for hermetically sealing said disc on said gun, said disc adapted to break at a predetermined pressure and to suddenly subject said material to a reduced pressure.

38. In an apparatus for puffing starch-containing materials, the combination with a gun into which the material is introduced and subjected to heat during the treatment of said material, said gun having a recess in one end thereof, of a frangible disc engaging said recess, a ring member for holding said disc hermetically sealed in said recess, and securing means for engaging said ring member, said disc adapted to break at a predetermined pressure and to suddenly subject said material to a reduced pressure.

39. In an apparatus for puffing starch-containing materials, the combination with a gun into which the material is introduced and subjected to heat during the treatment of said material, said gun having a recess in one end thereof, of a frangible disc engaging said recess, a yoke member pivotally mounted on said gun, a ring member for holding said disc hermetically sealed in said recess, and securing means for engaging said ring member, said disc adapted to break at a predetermined pressure and to suddenly subject said material to a reduced pressure.

40. In an apparatus for puffing starch-containing materials, the combination with a gun into which the material is introduced and subjected to heat during the treatment of said material, said gun having a recess in one end thereof, of a frangible disc engaging said recess, a yoke member pivotally mounted on said gun, a ring member for holding said disc hermetically sealed in said recess and pivotally mounted on said yoke member, and a locking-bolt for engaging said yoke, said disc adapted to break at a predetermined pressure and to suddenly subject said material to a reduced pressure.

41. A self-contained unitary apparatus for puffing starch-containing materials comprising a support, an oven tiltably mounted on said support, a gun for containing materials to be treated and rotatably mounted within said oven, said gun having a bevel gear on one end thereof, a shaft having a bevel gear mounted thereon in engagement with said first mentioned bevel gear, and a motor mounted on said oven and connected with said shaft for rotating said gun.

42. A self-contained unitary apparatus for puffing starch-containing materials comprising supports, an oven, a trunnion secured to each side of said oven and journalled in said support, an arm secured to one of said trunnions, means on said supports for engaging said arm for holding said oven in various positive positions, a gun for containing materials to be treated and rotatably mounted within said oven, and means for rotating said oven.

43. A self-contained unitary apparatus for puffing starch-containing materials comprising supports, an oven, a trunnion secured to each side of said oven and journalled in said supports, a quadrant secured to one of said supports and having a plurality of notches provided therein, an arm secured to one of said trunnions for engaging said notches on said quadrant for holding said oven in various positive positions, a gun for containing materials to be treated and rotatably mounted within said oven, and means for rotating said oven.

44. A self-contained unitary apparatus for puffing starch-containing materials comprising a support, an oven tiltably mounted on said support, a gun for containing the materials to be treated and rotatably mounted within said oven, a lid pivotally mounted on said gun, means on said gun for clamping the lid in a closed position, and means for suddenly releasing said lid.

45. A self-contained unitary apparatus for puffing starch-containing materials comprising a support, an oven tiltably mounted on said support, a gun for containing materials to be treated and rotatably mounted within said oven, a lid pivotally mounted on said gun and having a forked projection thereon, adjustable means pivotally mounted on said gun for engaging said forked projection and for clamping the lid in a closed position, means for sealing said lid when closed, and means for engaging said adjustable means for suddenly releasing the lid.

46. A self-contained unitary apparatus for puffing starch-containing materials comprising a support, an oven tiltably mounted on said support, a gun for containing materials to be treated and rotatably mounted within said oven, a yoke pivotally mounted on said gun, a lid adjustably mounted on said yoke for enclosing the open end of said gun, means for sealing said lid when closed, means for clamping said yoke in a closed position, and means for suddenly releasing said lid.

47. A self-contained unitary apparatus for puffing starch-containing materials comprising a support, an oven tiltably mounted on said support, a gun for containing materials to be treated and rotatably mounted within said oven, a yoke pivotally mounted on said gun, a lid for enclosing the open end of said gun, a threaded projection on said lid for adjustable engagement with said yoke, means for clamping said yoke in a closed position, and means for suddenly releasing said lid.

48. A self-contained unitary apparatus for puffing starch-containing materials comprising a support, an oven tiltably mounted on said support, a gun for containing materials to be treated and rotatably mounted within said oven, a yoke pivotally mounted on said gun, a lid for enclosing the open end of said gun, a threaded projection on said lid for adjustable engagement with said yoke, a threaded key member in said yoke for engagement with said threaded projection, adjustable means on said yoke for urging said key member against said threaded projection whereby said threaded projection is held in a fixed position, and means for suddenly releasing said lid.

49. A self-contained unitary apparatus for puffing starch-containing materials comprising a support, an oven tiltably mounted on said support, a gun for containing materials to be treated and rotatably mounted within said oven, a frangible disc for engaging a recess in the open end of said gun, a ring member for holding said disc in an hermetically sealed relation with said open end, a yoke member pivotally mounted on said gun and in which said ring member is pivotally mounted, and means for clamping said yoke in a closed position 50. A self-contained unitary apparatus for puffing starch-containing materials comprising a support, an oven tiltably mounted on said support, a gun for containing materials to be treated and rotatably mounted within said oven, a frangible disc for engaging a recess in the open end of said gun, a ring member for holding said disc in an hermetically sealed relation with said open end, and a yoke member pivotally and rotatably mounted on said gun and in which said ring member is pivotally mounted, and means for clamping said yoke in a closed position.

In witness whereof, I have hereunto subscribed my name.

OSCAR C. KIRN.

CERTIFICATE OF CORRECTION.

Patent No. 1,878,782.                                                                  September 20, 1932.

OSCAR C. KIRN.

It is hereby certified that error appears in the printed specification of the above numbered patent requiring correction as follows: Page 4, line 115, for "combination" read "combustion"; page 7, line 22, claim 1, for "when" read "after"; line 32, claim 3, for "to" read "after"; and line 33, after "pressure" insert the words "has been reached"; line 42, claim 4, for "when" read "after"; and line 79, claim 9, for "tiltable" read "tiltably"; and that the said Letters Patent should be read with these corrections therein that the same may conform to the record of the case in the Patent Office.

Signed and sealed this 29th day of November, A. D. 1932.

M. J. Moore,
                                                      Acting Commissioner of Patents.

(Seal)